(12) United States Patent
Dondo (10) Patent No.: US 8,613,519 B2
(45) Date of Patent: Dec. 24, 2013

(54) REFLECTOR FOR WIRE SPOKE WHEELS

(75) Inventor: Carlo Dondo, Sierre (CH)

(73) Assignee: CD Project SARL, Sierre (CH)

( * ) Notice: Subject to any disclaimer, the term of this patent is extended or adjusted under 35 U.S.C. 154(b) by 119 days.

(21) Appl. No.: 13/348,372

(22) Filed: Jan. 11, 2012

(65) Prior Publication Data

US 2012/0176679 A1     Jul. 12, 2012

(30) Foreign Application Priority Data

Jan. 11, 2011   (CH) .......................................... 50/11

(51) Int. Cl.
   *G02B 5/12*        (2006.01)
(52) U.S. Cl.
   USPC ......................................................... 359/549
(58) Field of Classification Search
   USPC .................. 359/523, 528, 546, 548, 549, 550
   See application file for complete search history.

(56) References Cited

U.S. PATENT DOCUMENTS

| 3,895,855 A |   | 7/1975 | Nagel |
|---|---|---|---|
| 3,995,938 A |   | 12/1976 | Olson |
| 4,718,743 A | * | 1/1988 | Leitzke .......................... 359/523 |
| 5,923,483 A | * | 7/1999 | Sloot ............................. 359/523 |

FOREIGN PATENT DOCUMENTS

| DE | 3021 856 A1 | 12/1981 |
|---|---|---|
| DE | 41 22 159 A1 | 1/1993 |
| EP | 1 043 177 A2 | 10/2000 |

* cited by examiner

*Primary Examiner* — Euncha Cherry
(74) *Attorney, Agent, or Firm* — Faegre Baker Daniels LLP (57) ABSTRACT

Disclosed herein is a retroreflector configured for mounting onto the spokes of a spoked wheel, comprising a body including fixing portions and a reflective surface extending over a major portion of the surface of the body, the body having an elongate shape and being configured so that it is mounted onto a spoke in the direction of its length l, its height h essentially being arranged orthogonal to the surface defined by a rotating spoke. The reflective surface has several reflecting surface portions, including two major opposite portions configured so that they are essentially orthogonal to the direction of rotation of the wheel and transverse to the direction of travel of the vehicle, their reflection being directed principally towards the front and the rear of the vehicle.

14 Claims, 7 Drawing Sheets

REFLECTOR FOR WIRE SPOKE WHEELS

BACKGROUND

The present invention concerns a retroreflector for wheels with spokes, in particular the spoked wheels of bicycles, but also of tricycles, wheelchairs or other vehicles with spoked wheels.

Different types of retroreflectors are available on the market, some retroreflectors being fixed to the frame of the bicycle, typically at the rear or in front, or on the bicycle pedals, or fixed onto the spokes of the bicycle wheels.

Retroreflectors fixed to the frame do not always offer sufficient visibility owing to their small size and static position relative to the bicycle frame. Moving retroreflectors, such as those on bicycle pedals or wheels, generate a moving reflection which is seen more easily and quickly by other road users, and from longer distances. A retroreflector which moves in relation to the frame of a bicycle or vehicle under consideration offers a reflected surface which sweeps across the light source and is reflected in different directions, thereby generating a signal of variable intensity that is better seen by road users.

One of the problems with retroreflectors fixed to the pedals, however, is that they may be partly or fully hidden by the cyclist's shoes or, when the cyclist is going downhill or stops pedalling, they no longer offer the advantage of a moving reflective surface. For retroreflectors fixed to the wheels, the reflective surface is placed parallel to the general plane of the surface defined by the wheel spokes, which makes these retroreflectors highly visible on the sides of the bicycle or vehicle but they are not or only scarcely visible for persons positioned in the line of travel of the bicycle coming from the opposite direction to the bicycle or from behind the bicycle.

There is a need to improve the safety of road users under conditions of reduced visibility, at night, in the fog or when it is raining.

SUMMARY OF INVENTION

It is an object of the invention to provide a retroreflector for non-motorized vehicles having spoked wheels, bicycles in particular, offering excellent visibility when it is dark or at night-time.

It is advantageous to provide a retroreflector for bicycles and other non-motorized vehicles having wheels with spokes, which is easy to install and is reliably secured.

It is advantageous to provide a retroreflector which is economical to manufacture.

Disclosed herein is a retroreflector configured for mounting onto the spokes of a spoked wheel, comprising a body including fixing portions and a reflective surface extending over a major portion of the surface of the body, the body having an elongate shape and being configured so that it is mounted onto a spoke in the direction of its length l, its height h essentially being arranged orthogonal to the surface defined by a rotating spoke. The reflective surface has several reflecting surface portions, including two major opposite portions configured so that they are essentially orthogonal to the direction of rotation of the wheel and transverse to the direction of travel of the vehicle, their reflection being directed principally towards the front and the rear of the vehicle.

The fixing portions are preferably arranged at the opposite ends of the body along its length 4 a head fixing portion being configured to hook over crossed-over spokes and a tail fixing portion being configured to be fastened onto a single spoke. The head fixing portion comprises a channel formed between two walls having a width r configured so that it is possible to insert a spoke in the channel. One or both walls may advantageously comprise a notch or side opening of sufficient width to allow the passing of a spoke through the side opening. Either side of the side opening, wings are advantageously provided forming a flat supporting surface arranged either side of a cross-over spoke to stop rotation of the retroreflector around a main spoke. The tail fixing portion may also comprise a channel formed between two walls having a width r configured so that it is possible to insert a spoke in the channel, one or both channels possibly comprising protuberances or lugs for fastening the spoke. Both channels may also have a width which narrows continuously or stepwise with a plurality of fastening protuberances at different heights so that it is possible to lodge spokes of different diameters.

The reflective surface has a minor, lateral reflective surface portion configured so that it is essentially parallel to the plane of the spokes of the wheel, the reflection of these surfaces being especially visible on the sides of the moving vehicle. The minor lateral reflective surface may advantageously comprise a first portion configured so that it is arranged essentially parallel to the spokes and a second portion at an angle a, so as to form a cone of reflection when the wheel rotates. The cone angle may be between 6° and 18°.

The height h of the retroreflector is preferably between 12 and 18 mm. The length l of the retroreflector in the direction of the spoke is preferably 100 mm or more, and the width w of the retroreflector is preferably between 5 and 13 mm. The proportion between the height h and width w is preferably between 0.4 and 0.9.

Other objectives and advantageous aspects of the invention will be apparent from the claims and the detailed description given below, and from the appended drawings in which:

BRIEF DESCRIPTION OF THE DRAWINGS

FIG. 1c is a cross-sectional view through the wheel in FIG. 1a;

FIG. 3b is a view in the direction of the arrow III-B in FIG. 3a;

FIG. 3d is a view of the retroreflector in the direction of arrow III-D in FIG. 3a;

DETAILED DESCRIPTION

With reference to the figures, principally FIGS. 1b and 3a to 3d, a retroreflector 2 configured to be mounted on the spokes 1 of a spoked wheel 3, comprises a body 4 including fixing portions 5, 6, and a reflective surface 7 extending over the most part of the surface of the body 4. The reflective surface 7 may comprise reflective materials and structures known per se, used in known retroreflectors or in other known reflective surfaces for traffic signs or sports items.

The body 4 is of elongate shape having a length l, thickness w and height h, the body being configured to be mounted on a spoke 1 in the direction of its length l, the height h essentially being arranged orthogonal to the surface defined by a spoke of a rotating wheel. The surface having the thickness w is arranged approximately parallel to the plane defined by the rotation of a spoke, namely a plane parallel or almost parallel to the direction of travel of the wheel and of the vehicle coupled to this wheel.

The reflective surface 7 therefore has several reflecting surface portions, including two opposite major surface portions $7hl_1$ and $7hl_2$, a minor surface portion $7wl$ and an end surface portion $7hw$. Since the major surface portions $7hl_1$ and $7hl_2$ are essentially orthogonal to the direction of rotation of the wheel and hence transverse to the direction of travel of the vehicle, their reflection is mainly directed towards the front and the rear of the vehicle, whilst the minor surface $7hw$ is essentially parallel to the plane of the spokes of the wheel, the reflection of these surfaces is especially visible on the sides of the moving vehicle. In variants, the minor side surface portion could however join up either side edge with the major surface portions, via a curve or chamfer such as illustrated in FIGS. 4a to 4d.

It is to be noted that with conventional retroreflectors for spoked wheels, the major reflective surface is essentially parallel to the spokes of the wheel and is directed towards the sides, whereas in the present invention, the major surface $7hl_1$ and $7hl_2$ is directed towards the front and rear of the vehicle. The minor surface $7wl$ of the retroreflector according to the invention is very efficient despite its relatively reduced surface area, because of its relatively long length l extending along a spoke, whereby the surface swept by this minor surface $7wl$ when the wheel rotates is extensive and therefore offers large lateral visibility. In addition, the minor lateral surface $7wl$ may comprise a first portion $7wl_1$ configured so that it is essentially arranged parallel to the spokes 1, and a second portion $7wl_2$ configured to have an inclined angle (straight or curved line having different shapes) so as to present an inclined surface, in order to form a cone of reflection when the wheel rotates. Therefore visibility is improved not only directly laterally, but also towards the front and rear at a cone angle a which is advantageously larger than 8°. The relatively tall height h of the retroreflector according to the invention, compared with the very flat retroreflectors in conventional solutions, in a direction orthogonal to the plane of the spokes, therefore offers several advantages: a large reflective surface orthogonal to the direction of travel of the vehicle, and a lateral cone of reflection improving lateral visibility.

The height h of the retroreflector may advantageously be 10 mm or more, preferably between 10 and 20 mm, preferably between 12 and 18 mm.

The length l of the retroreflector in the direction of the spoke may advantageously be 100 mm or more, preferably between 100 and 150 mm, preferably between 110 and 140 mm.

The width w of the retroreflector may advantageously be more than 5 mm, preferably between 5 and 13 mm, preferably between 7 and 10 mm.

The proportion between the height h and width w may preferably lie between 0.4 and 0.9.

The cone angle a may advantageously be between 6 and 18°, preferably between 9 and 15°.

It is to be noted that since the spoke of a wheel is already slightly inclined relative to the plane parallel to the direction of travel of the vehicle, the entire minor lateral surface $7wl$ is already globally inclined at the angle of incline of the spoke on which the retroreflector is mounted.

Figure 1A:
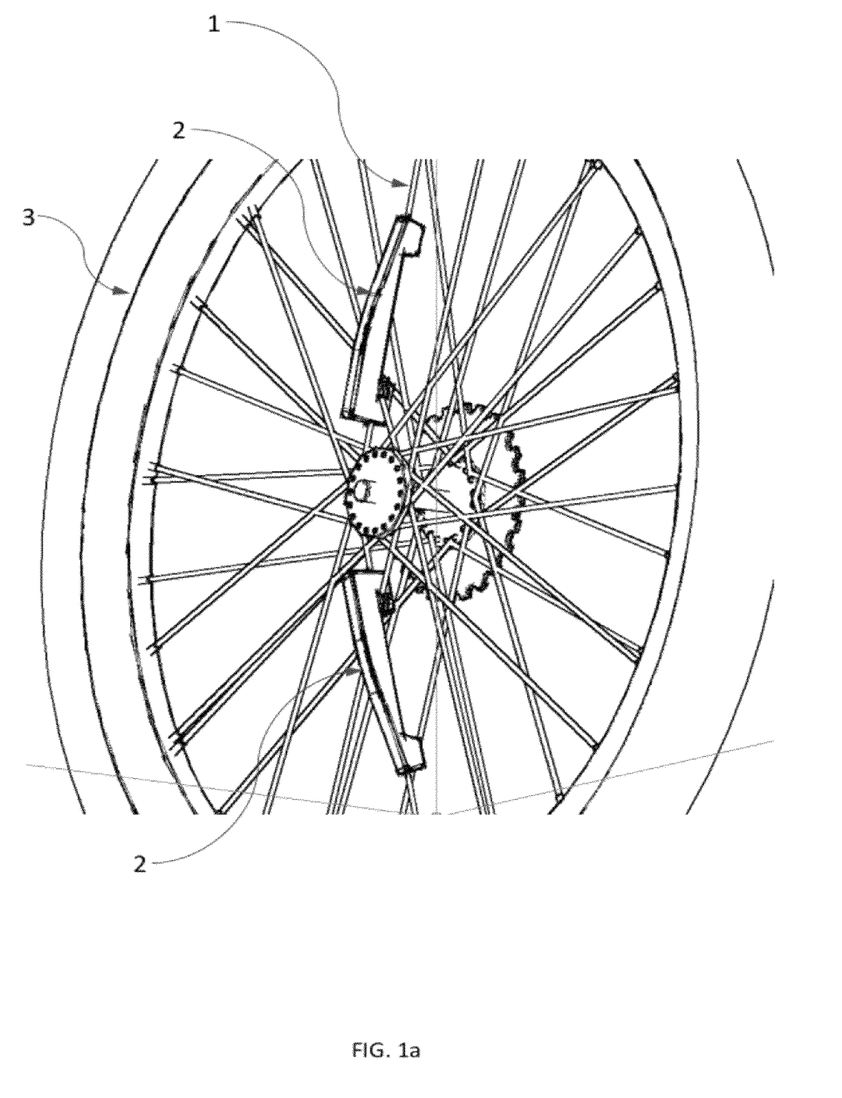
FIG. 1a is a perspective view of retroreflectors according to an embodiment of the invention, shown mounted on the spokes of a wheel.
Figure 1B:
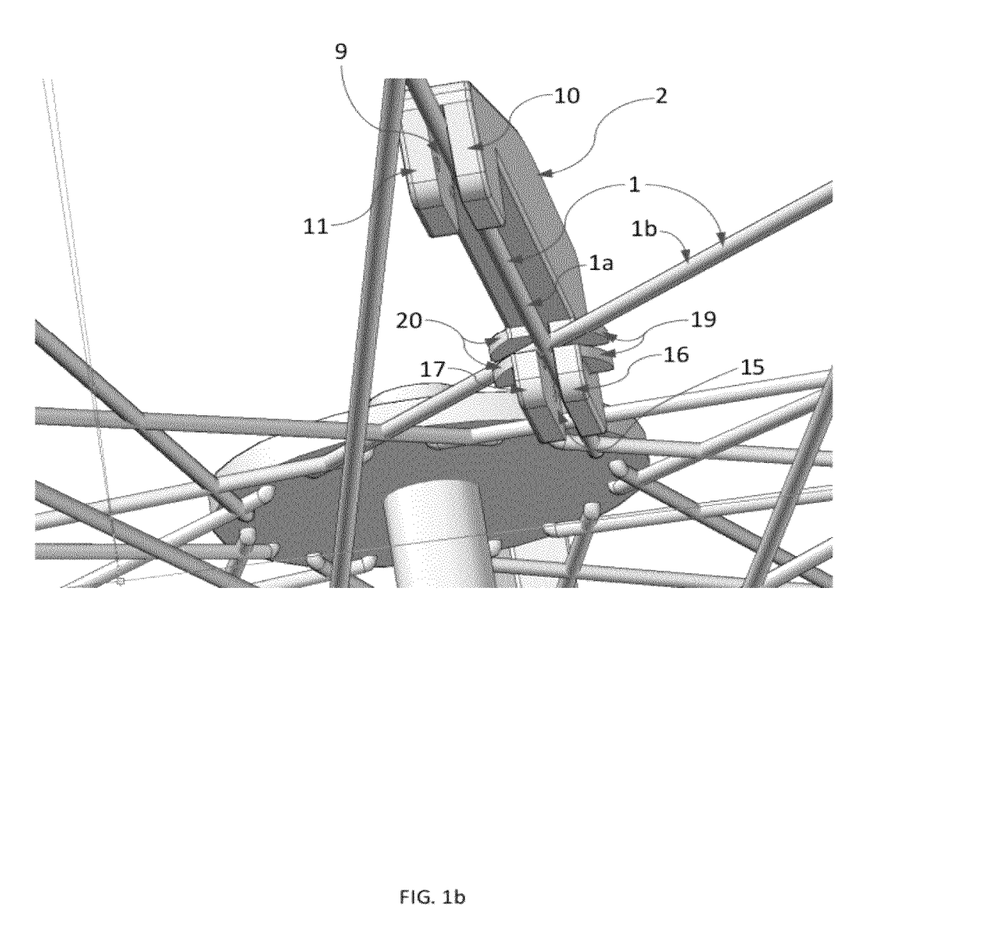
FIG. 1b is a detailed perspective view of a retroreflector according to an embodiment of the invention, mounted on spokes of a wheel.
Figure 1C:
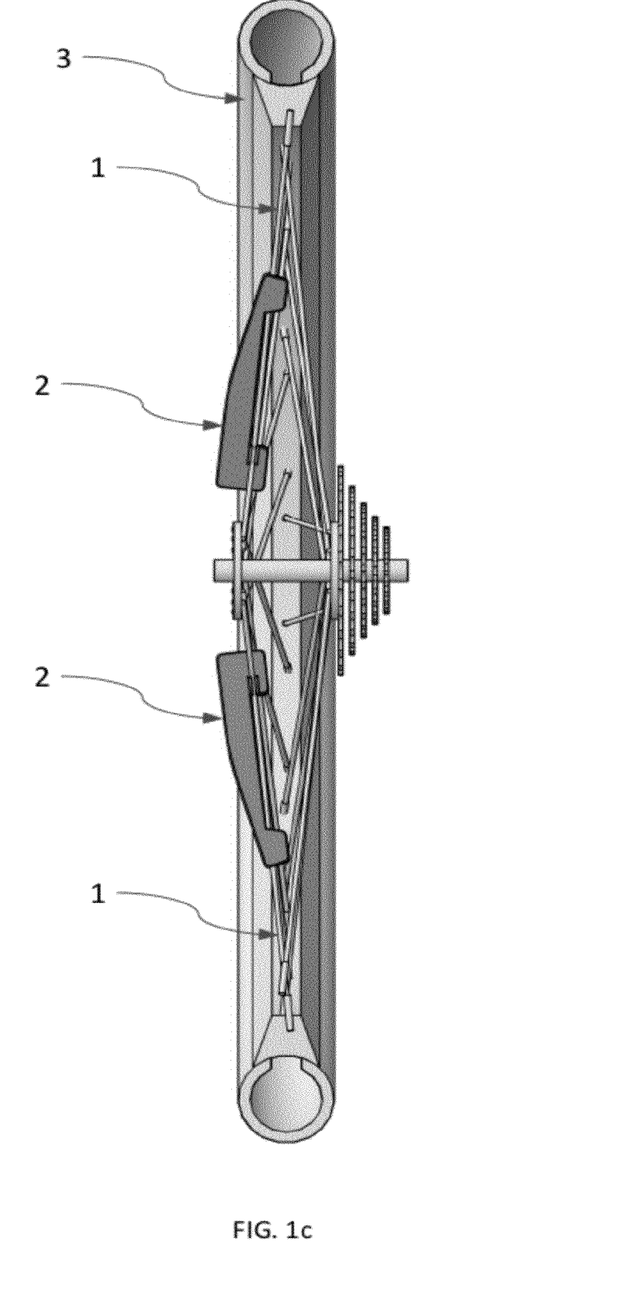

The fixing portions 5, 6 of the retroreflector are arranged at the opposite ends of the body 4 in the direction of its length l, to ensure strong mounting stability on the spoke 1. One fixing portion 5 is configured to hook over a spoke crossing as illustrated in FIG. 1b, and the other fixing portion is configured to be secured to a single spoke 1. For ease of referencing, the fixing portion 5 will be designated hereafter as the head fixing portion, and the fixing portion 6 as the tail fixing portion.

The tail fixing portion 6 comprises a channel 9 formed between two walls 10, 11 arranged either side of the channel 9. The width r of the channel 9 is essentially equal to the diameter of the spoke of a spoked wheel or slightly larger so that the spoke can be inserted in the channel. The channel is provided with fastening protuberances 12, e.g. in the form of lugs having an angled insertion surface facing the open side of the channel and an abutment shoulder directed towards the bottom of the channel to clip the spoke into the channel. In order to enable it to adapt to spokes of different diameters, depending upon the standards to be followed, the channel 9 may be of variable width, varying continuously or stepwise, having lugs at different heights so that the spoke can be inserted at different heights as a function of the diameter of the spoke as illustrated in FIG. 3e.

Figure 3A:
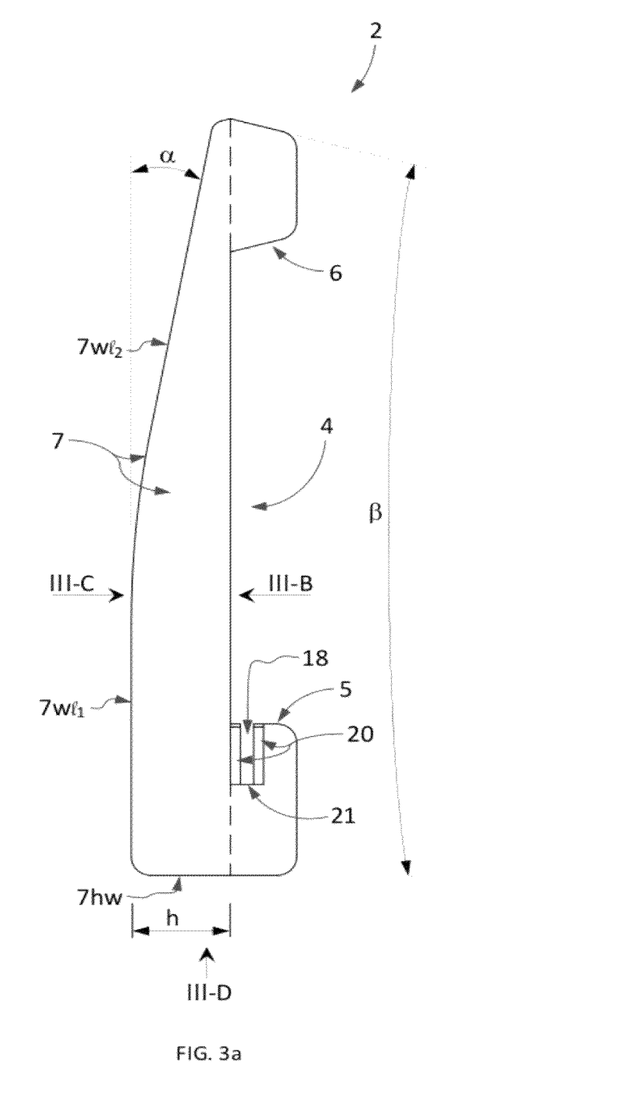
FIG. 3a is a planar side view of a retroreflector according to an embodiment of the invention.
Figure 3B:
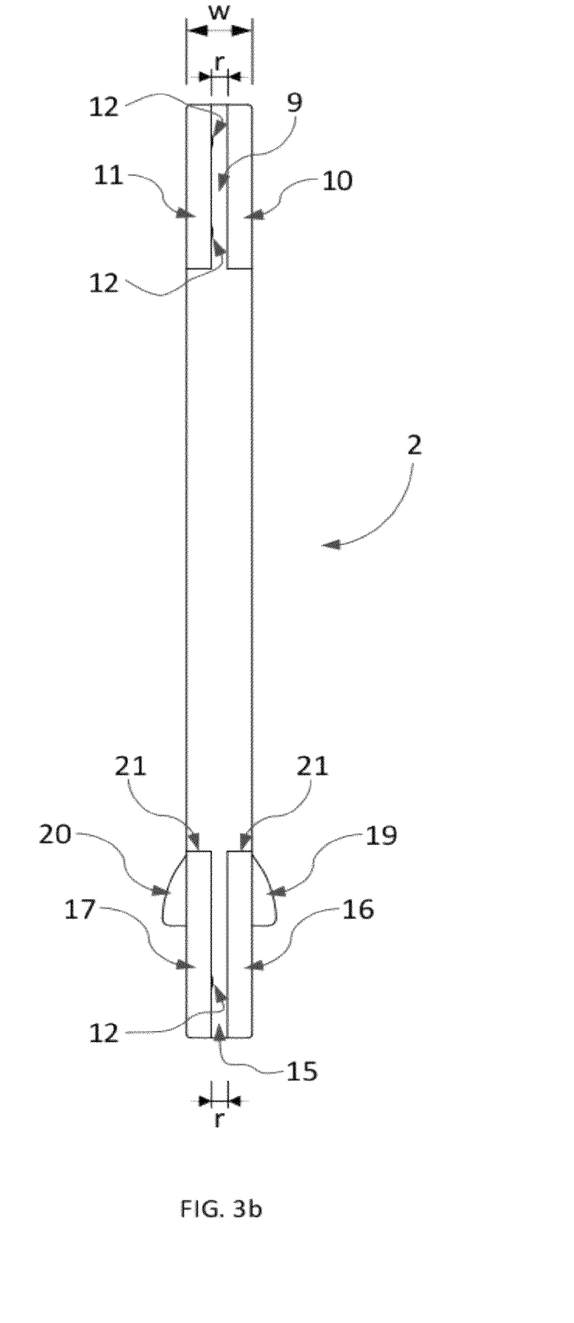
Figure 3C:
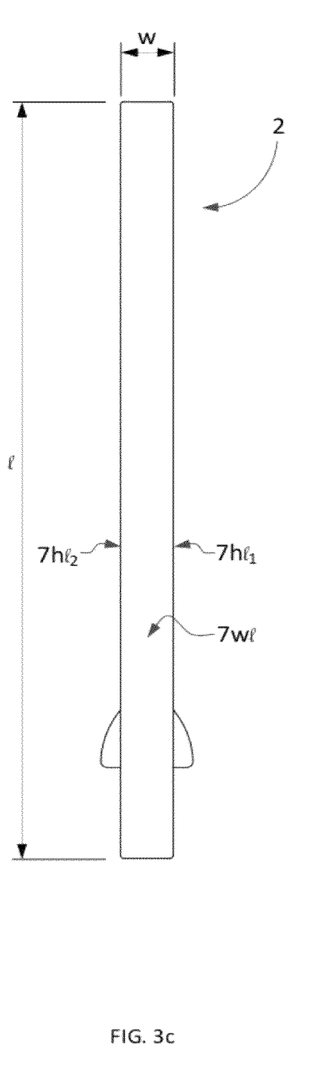
FIG. 3c is a view of the retroreflector in the direction of the arrow III-C.
Figure 3D:
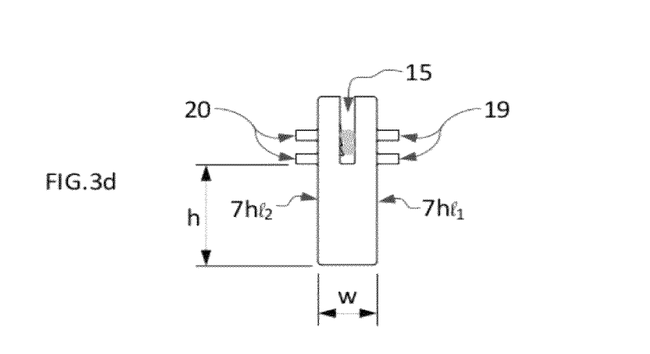
Figure 3E:
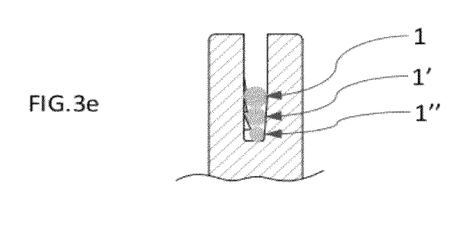
FIG. 3e is a detailed cross-sectional view through a fixing portion of the retroreflector.
Figure 4A:
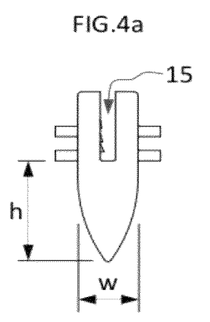
FIGS. 4a to 4d illustrate profiles of the retroreflector according to several variants of the invention.
Figure 4B:
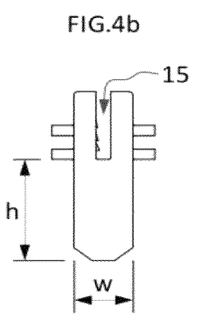
Figure 4C:
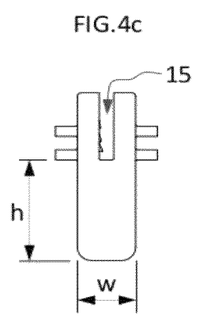
Figure 4D:
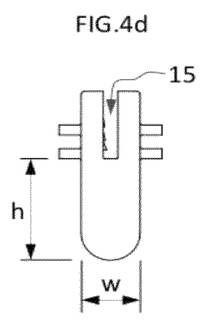

The head fixing portion 5 also comprises a channel 15 with protuberances 12 for fastening of the spoke 1, the channel possibly having a width which narrows continuously or stepwise with a plurality of fastening protuberances 12a, 12b, 12c at different heights so as to lodge spokes of different diameters (see FIG. 3e). The channel 15 is formed between two walls 16, 17 comprising a notch or side opening 18 extending from an inner edge 21 of the walls 16, 17 and of sufficient width to allow the passing of a spoke through the side opening 18. The side opening therefore has a height r' with a diameter equivalent to or slightly larger than the diameter of the thickest spoke intended for the retroreflector. With this configuration, it is advantageously possible for the retroreflector of the invention to have the head fixing portion 5 arranged close to the wheel hub and to end at the crossover of two spokes as illustrated in FIGS. 1a and 1b. One of the spokes 1a is aligned in the channels 9, 15 of the two fixing portions whilst the spoke 1b which crosses over the spoke 1a close to the hub passes through the passageway or side opening 18 in at least one of the walls 16, 17. Either side of the opening 18, on each side of the body, there are wings 19, 20 which form a supporting flat surface either side of the crossover spoke 1b to prevent rotation of the retroreflector around the main spoke 1a.

The bottom 21 of the side opening 18 forms an abutment bearing against the crossover spoke 1b to maintain the position of the retroreflector on the spoke 1a, taking into account the centripetal force acting on the retroreflector when the wheel rotates.

The retroreflector has a negligible influence on the coefficient of friction of the rotating wheel, since the top part of height h lies towards the head fixing portion 5 i.e. close to the axis of rotation of the wheel. This also makes it possible for the position of the major reflective surface $7lh_1$ and $7lh_2$ to extend beyond the thickness of the tyre as seen in the line of travel of the vehicle from behind or from the front, for improved visibility. Since the major reflective surfaces are directed towards the front and the rear of the wheel in the line of travel of the vehicle, and taking into account to the length l of the body along a spoke, the visibility of the rotating reflective element according to the invention is extremely good even from a long distance away.

Figure 2:
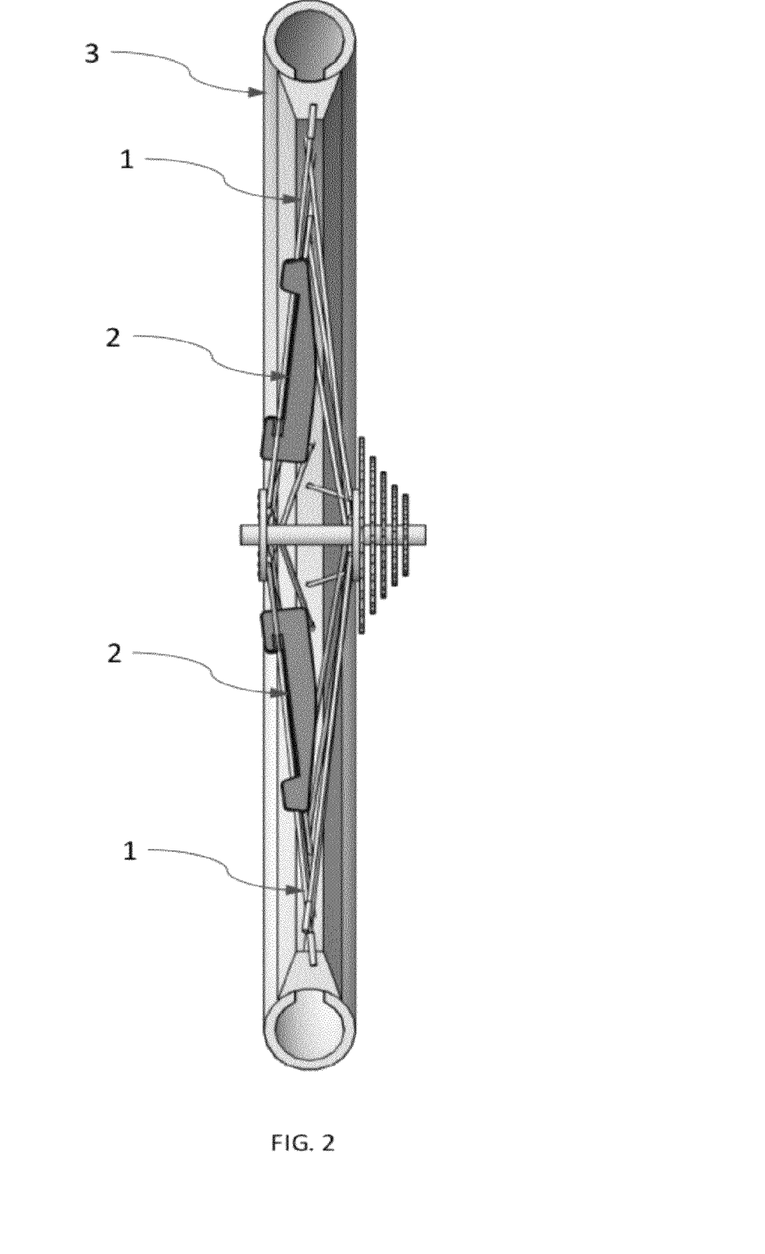
FIG. 2 is a cross-sectional view of a wheel with spokes, with retroreflectors fixed inside the spokes, according to a variant.

The retroreflector of the invention may also, however, be arranged inside the spokes of a bicycle as illustrated in FIG. 2 for mounting on the front wheel, so as not to interfere with the supporting forks of the front wheel. This configuration complements the retroreflectors fixed to the spokes of the rear wheel of the bicycle, offering additional visibility. It is also possible to place several retroreflectors on different spokes of a wheel both inside and outside.

What is claimed is:

1. A retroreflector configured to be mounted on the spokes of a spoked wheel of a vehicle, comprising a body including fixing portions and a reflective surface extending over a major portion of the surface of the body, the body being of elongate shape having a length, a thickness and a height, the body being configured for mounting on a spoke and oriented such that said length extends in a longitudinal direction of said spoke, the height essentially being arranged orthogonal to the surface defined by a spoke of a spoked wheel in rotation, the reflective surface comprising several reflecting surface portions including at least two major portions configured so that they are essentially orthogonal to a direction of rotation of the spoked wheel and transverse to a direction of travel of the vehicle, their reflection being principally directed towards a front and a rear of the vehicle, wherein the fixing portions are arranged at the opposite ends of the body in a direction of its length, a head fixing portion being configured to hook over a crossing of two spokes and a tail fixing portion being configured for fastening onto a single spoke.

2. The retroreflector according to claim 1, wherein the head fixing portion comprises a channel formed between two walls having a width configured to receive a spoke inserted in the channel.

3. The retroreflector according to claim 2 wherein one or both walls comprise a notch or side opening extending from an inner edge of one or both walls and of sufficient width to allow the passing of a spoke through the side opening.

4. The retroreflector according to claim 3, comprising wings arranged either side of the side opening on one or on each side of the body, the wings forming a supporting surface configured to be arranged either side of a crossing of spokes to prevent rotation of the retroreflector around a spoke.

5. The retroreflector according to claim 1, wherein the tail fixing portion comprises a channel formed between two walls having a width configured to receive a spoke inserted in the channel.

6. The retroreflector according to claim 1, wherein one or both channels comprise protuberances for fastening of the spoke.

7. The retroreflector according to claim 1, wherein one or both channels have a width which narrows continuously or stepwise with a plurality of fastening protuberances at different heights so as to house spokes of different diameters.

8. The retroreflector according to claim 1, wherein the reflective surface has a lateral minor reflecting surface configured so that it is essentially parallel to the plane of the spokes of the wheel, the reflection of this surface portion being especially visible on the sides of the moving vehicle.

9. The retroreflector according to claim 8, wherein the lateral minor reflecting surface comprises a first portion configured to be arranged essentially parallel to the spokes, and a second portion configured to form a cone angle α so as to form a cone of reflection when the spoked wheel rotates.

10. The retroreflector according to claim 9, wherein the cone angle is between 6° and 18°.

11. The retroreflector according to claim 1, wherein the height of the retroreflector is between 12 mm and 18 mm.

12. The retroreflector according to claim 1 wherein the length of the retroreflector in the direction of the spoke is greater than 100 mm.

13. The retroreflector according to claim 1, wherein the width of the retroreflector is between 5 and 13 mm.

14. The retroreflector according to claim 1, wherein the proportion between the height and the width w is between 0.4 and 0.9.

\* \* \* \* \*